United States Patent
Ogane

(10) Patent No.: US 9,962,998 B2
(45) Date of Patent: May 8, 2018

(54) PNEUMATIC TIRE

(71) Applicant: BRIDGESTONE CORPORATION, Chuo-ku, Tokyo (JP)

(72) Inventor: Shun Ogane, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 96 days.

(21) Appl. No.: 14/912,203

(22) PCT Filed: Aug. 7, 2014

(86) PCT No.: PCT/JP2014/071418
§ 371 (c)(1),
(2) Date: Feb. 16, 2016

(87) PCT Pub. No.: WO2015/025790
PCT Pub. Date: Feb. 26, 2015

(65) Prior Publication Data
US 2016/0193885 A1    Jul. 7, 2016

(30) Foreign Application Priority Data

Aug. 23, 2013 (JP) .................................. 2013-173713

(51) Int. Cl.
| | |
|---|---|
| B60C 11/13 | (2006.01) |
| B60C 11/03 | (2006.01) |
| B60C 23/19 | (2006.01) |

(52) U.S. Cl.
CPC ...... *B60C 11/1307* (2013.01); *B60C 11/0306* (2013.01); *B60C 11/0309* (2013.01);
(Continued)

(58) Field of Classification Search
CPC ......... B60C 2011/0369; B60C 11/1315; B60C 11/13; B60C 2011/133; B60C 2011/1353; B60C 2011/1307
See application file for complete search history.

(56) References Cited

U.S. PATENT DOCUMENTS 2,604,920 A * 7/1952 Kirby .................. B60C 11/0309
152/151
4,550,756 A * 11/1985 Hinkel .................... B60C 11/01
152/209.24
(Continued)

FOREIGN PATENT DOCUMENTS

| CN | 102275468 A | 12/2011 |
|---|---|---|
| JP | 2001-180231 A | 7/2001 |

(Continued)

*Primary Examiner* — Jodi C Franklin
(74) *Attorney, Agent, or Firm* — Kenja IP Law PC

(57) ABSTRACT

A pneumatic tire includes a recess formed on a groove wall surface of a circumferential groove opposite to a widthwise groove. A wall surface defined by the recess includes an inclined surface inclined towards the widthwise groove from a tire radial direction outer side towards a tire radial direction inner side and a curved surface connecting a tire radial direction inner end of the inclined surface to a bottom defined by the recess, the curved surface having a center of curvature on the side of the widthwise groove. As a connection point between the inclined surface and the curved surface is at a position in the tire circumferential direction at which a width W of the recess in the tire width direction is smaller, the connection point is located further inward in the tire radial direction.

8 Claims, 7 Drawing Sheets

(52) U.S. Cl.
CPC .......... *B60C 11/0327* (2013.01); *B60C 23/19* (2013.01); *B60C 2011/0353* (2013.01); *B60C 2011/0355* (2013.01); *B60C 2011/0358* (2013.01); *B60C 2011/0365* (2013.01); *B60C 2011/0381* (2013.01); *B60C 2011/133* (2013.01); *B60C 2200/06* (2013.01); *B60C 2200/065* (2013.01)

(56) References Cited

U.S. PATENT DOCUMENTS

| | | | | |
|---|---|---|---|---|
| 6,079,464 | A * | 6/2000 | Hatakenaka | B60C 11/00 152/209.24 |
| 6,220,321 | B1 * | 4/2001 | Yoshioka | B60C 11/0306 152/209.18 |
| 6,571,843 | B2 * | 6/2003 | Takada | B60C 11/11 152/209.15 |
| 7,628,880 | B2 * | 12/2009 | Vervaet | B60C 11/0302 152/209.24 |
| 7,669,624 | B2 * | 3/2010 | Yagita | B60C 11/0306 152/209.24 |
| 2001/0027835 | A1 * | 10/2001 | Takada | B60C 11/11 152/209.24 |
| 2006/0191616 | A1 * | 8/2006 | Canankamp | B60C 11/0302 152/209.24 |
| 2007/0151645 | A1 * | 7/2007 | Mathews | B60C 11/0309 152/209.18 |
| 2010/0139827 | A1 * | 6/2010 | Kawagoe | B60C 11/042 152/209.19 |
| 2010/0206445 | A1 * | 8/2010 | Dobashi | B60C 11/0318 152/209.15 |
| 2011/0005649 | A1 * | 1/2011 | Aoki | B60C 11/0306 152/209.1 |
| 2013/0306210 | A1 * | 11/2013 | Matsuzawa | B60C 11/0327 152/209.22 |
| 2014/0290817 | A1 * | 10/2014 | Kawakami | B60C 11/1307 152/209.18 |
| 2016/0009144 | A1 * | 1/2016 | Kawakami | B60C 11/0306 152/209.23 |

FOREIGN PATENT DOCUMENTS

| | | |
|---|---|---|
| JP | 2004-262295 A | 9/2004 |
| JP | 2007-230399 A | 9/2007 |
| JP | 2013-086565 A | 5/2013 |
| WO | 2013/054950 A1 | 4/2013 |

\* cited by examiner (a)

(b)

(c)

(a)

(b)

(c)

PNEUMATIC TIRE

TECHNICAL FIELD

This disclosure relates to a pneumatic tire, particularly to a pneumatic tire suitably used on a heavy duty vehicle such as a construction vehicle.

BACKGROUND

As a pneumatic tire that increases heat dissipation of the tread portion while minimizing an increase in groove area, the applicant has proposed a technique for forming a recess on a groove wall surface of a circumferential groove opposite to a widthwise groove (see WO2013/054950 (PTL 1)). According to this technique, wind flows into the groove efficiently, thereby increasing heat dissipation of the tread rubber.

CITATION LIST

Patent Literature

PTL 1: WO2013/054950

SUMMARY

Technical Problem

The above-described technique, however, has room for improvement in the reduction of stone trapping in the above-mentioned recess. Therefore, it would be helpful to provide a pneumatic tire that reduces stone trapping while guaranteeing heat dissipation in the tread portion and that has an extended tire life.

Solution to Problem

A summary of this disclosure is as follows. A pneumatic tire of this disclosure includes, in a tread surface, at least one circumferential groove extending along a tire circumferential direction and a plurality of widthwise grooves opening to the circumferential groove, the widthwise grooves having a groove width wider than a groove width of the circumferential groove at least in a portion opening to the circumferential groove, and the widthwise grooves extending in a direction inclined with respect to the tire circumferential direction, such that a recess is formed on a groove wall surface of the circumferential groove opposite to the widthwise groove, a wall surface defined by the recess includes an inclined surface inclined towards the widthwise groove from a tire radial direction outer side towards a tire radial direction inner side and a curved surface connecting a tire radial direction inner end of the inclined surface to a bottom defined by the recess, the curved surface having a center of curvature on the side of the widthwise groove, and as a connection point between the inclined surface and the curved surface is at a position in the tire circumferential direction at which a width W of the recess in the tire width direction is smaller, the connection point is located further inward in the tire radial direction.

In this disclosure, an "applicable rim" refers to a rim prescribed in accordance with valid industrial standards for the region in which the tire is produced and used, such as the "JATMA (Japan Automobile Tyre Manufacturers Association) Year Book" in Japan, the "ETRTO (European Tyre and Rim Technical Organisation) Standard Manual" in Europe, and the "TRA (Tire and Rim Association, Inc.) Year Book" in the United States of America. The "prescribed internal pressure" (maximum air pressure) refers to the internal pressure corresponding to the tire maximum load capability in the above-mentioned standards for a tire of applicable size.

In a cross-sectional view of the wall surface defined by the recess, the "inclination angle" refers to the angle, with respect to the tire radial direction, formed by a line connecting the outermost point of the inclined surface in the tire radial direction (intersection between the inclined surface and the tread surface) and the innermost point of the inclined surface in the tire radial direction (the above-mentioned connection point).

The "maximum load" refers to the maximum load (maximum load capability) for a single wheel of the applicable size as listed in the above-mentioned standards.

Advantageous Effect

According to this disclosure, a pneumatic tire that reduces stone trapping while guaranteeing heat dissipation in the tread portion and that has an extended tire life can be provided.

DETAILED DESCRIPTION

Figure 1:
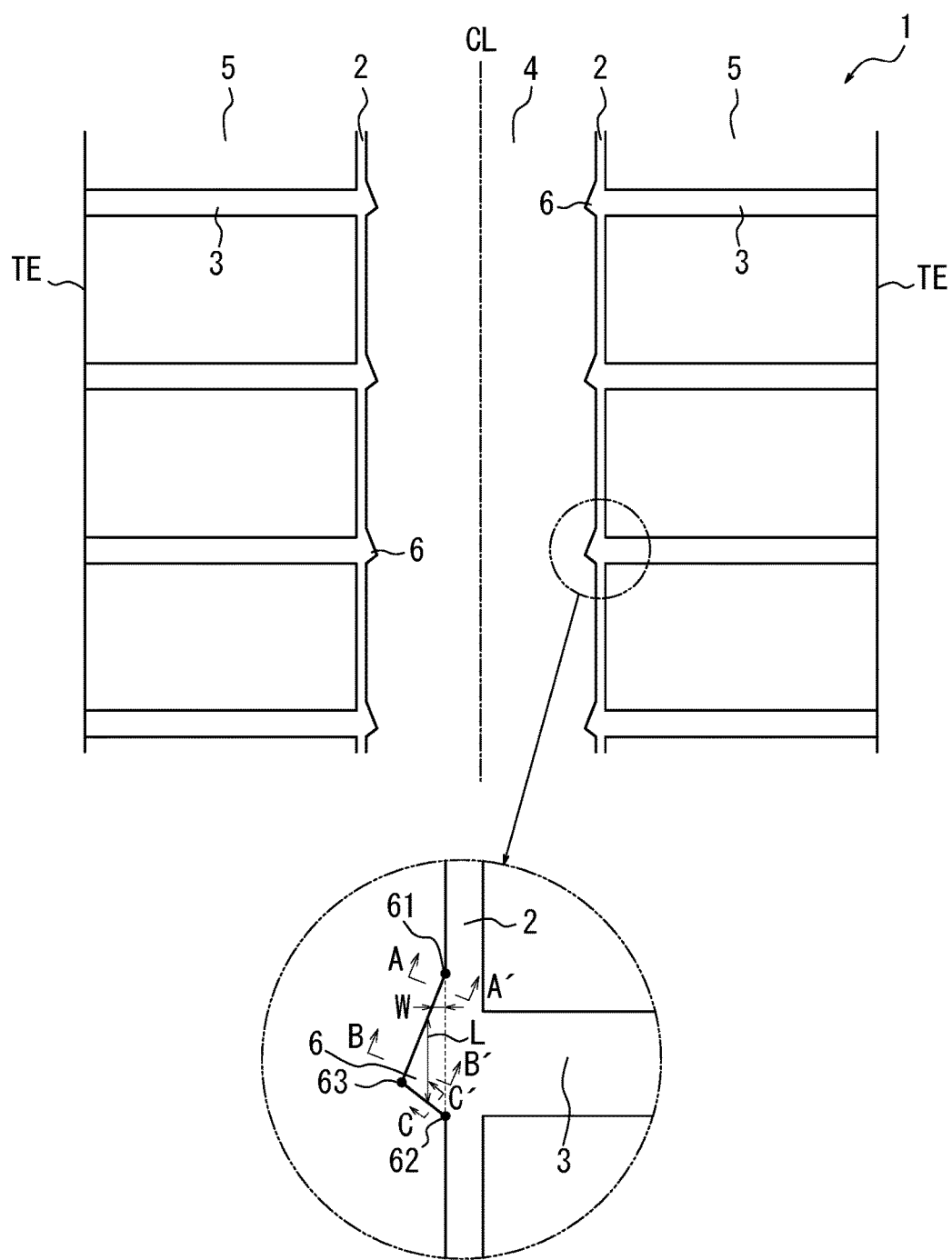
FIG. 1 is a development view of the tread surface of a pneumatic tire according to one of the disclosed embodiments.

With reference to the drawings, the following describes a pneumatic tire according to this disclosure in detail. FIG. 1 is a development view of the tread pattern of a suitable pneumatic tire according to one of the disclosed embodiments as used on a heavy duty vehicle. A tread surface 1 includes circumferential grooves 2 extending along the tire circumferential direction, one on either side of the tire equatorial plane CL in the illustrated example, and a plurality of widthwise grooves 3 opening to the circumferential grooves 2, the widthwise grooves 3 having a groove width wider than the groove width of the circumferential groove 2 at least in a portion opening to the circumferential groove 2. The widthwise grooves 3 extend in a direction inclined with respect to the tire circumferential direction (along the tire width direction in the illustrated example). In the illustrated example, each widthwise groove 3 is in communication with a tread end TE. A rib-shaped central land portion 4 extending across the tire equatorial plane CL is defined by the central circumferential grooves 2. Also, block-shaped land portions 5 are defined by the circumferential grooves 2 and the widthwise grooves 3. Note that the illustrated tread pattern is only an example, and this disclosure is applicable to both rib-based patterns and block-based patterns. Also, the widthwise grooves 3 may be inclined with respect to the tire width direction and may have a non-constant width that varies. Furthermore, the widthwise grooves 3 need not be in communication with the tread end TE. In the illustrated example, the circumferential grooves 2 extend along ⅛ points (when M is the line along the midpoints between the tread edge and the tire equatorial plane, the ⅛ points form a line along the midpoints between the line M and the tire equatorial plane).

In the rib-shaped central land portion 4, a recess 6 is formed on a groove wall surface of the circumferential groove 2 opposite to the widthwise groove 3. As illustrated in the enlarged view, the recess 6 in the illustrated example is approximately triangular in plan view, and a width W of the recess 6 in the tire width direction varies along the tire circumferential direction. That is, the width W gradually increases from a connection point 61 between the recess 6 and the circumferential groove 2 to an apex 63 of the recess 6 and then gradually decreases from the apex 63 to a connection point 62 between the recess 6 and the circumferential groove 2. Also, a length L of the recess 6 in the tire circumferential direction decreases from a side that opens to the circumferential groove 2 toward the back of the recess. That is, the length L is longest between the connection point 61 and the connection point 62 and decreases towards the apex 63.

Figure 2:
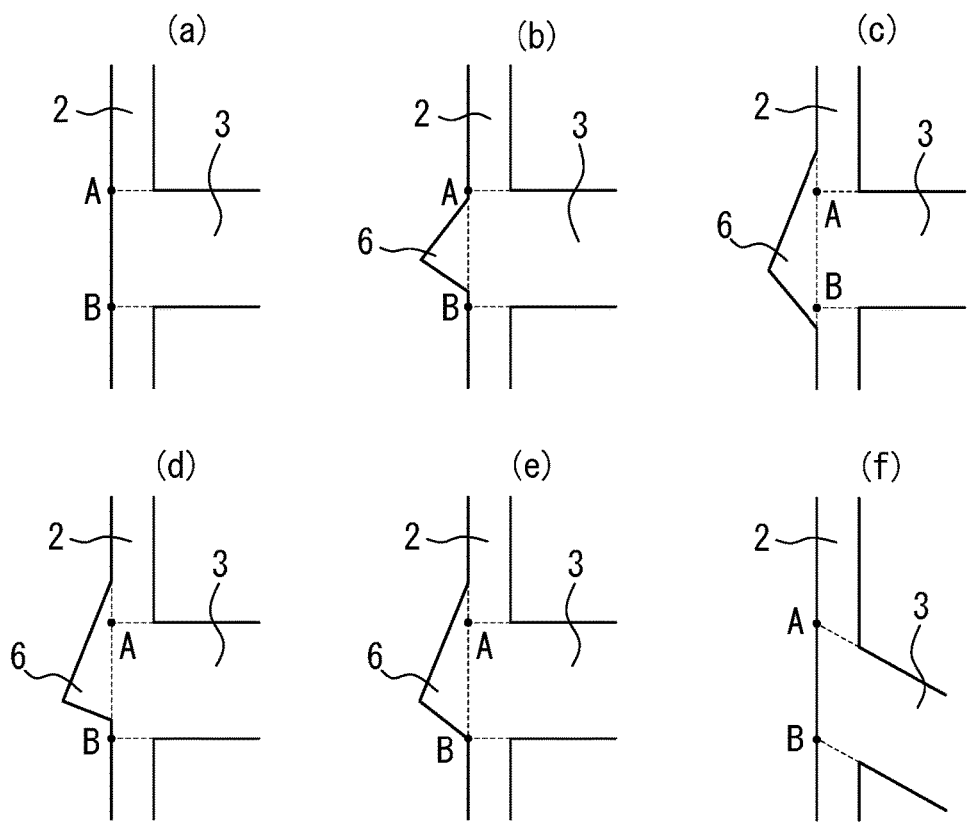
FIGS. 2A to 2F illustrate positions of the recess.

Referring now to FIG. 2, the groove wall surface of the circumferential groove 2 opposite to the widthwise groove 3 is described. As illustrated in FIG. 2A, when the recess 6 is not formed, the groove wall surface of the circumferential groove 2 opposite to the widthwise groove 3 is represented by the surface between points A and B, which are intersections of extensions of the groove wall surfaces of the widthwise groove 3 and the groove wall of the circumferential groove 2. The recess 6 may be formed between points A and B as illustrated in FIG. 2B, or protrude outside the points A and B as illustrated in FIG. 2C. Alternatively, as illustrated in FIG. 2D, one of the intersections of the circumferential groove 2 and the recess 6 may be formed between the point A and the point B while the other is formed outside the points A and B. That is, the recess 6 is formed at least partially between the points A and B. As illustrated in FIG. 2E, the recess 6 is preferably formed having one of the intersections thereof with the circumferential groove 2 formed outside the points A and B and the other meeting the point B. As illustrated in FIG. 2F, when the widthwise groove 3 is inclined with respect to the tire width direction, the groove wall surface of the circumferential groove 2 opposite to the widthwise groove 3 is represented by the surface between points A and B, which are intersections of extensions of the groove wall surfaces of the widthwise groove 3 and the groove wall of the circumferential groove 2.

Figure 3:
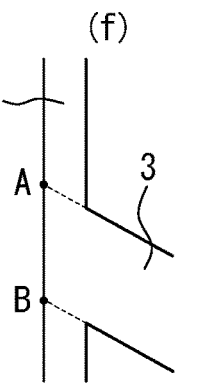
FIG. 3 illustrates a function of this disclosure.
Figure 4:
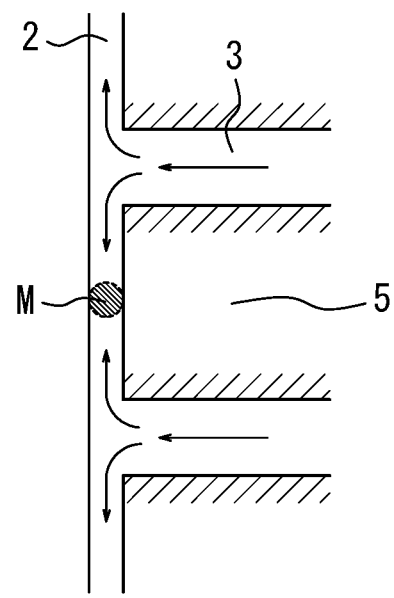
FIGS. 4A to 4C illustrate a function of this disclosure.
Figure 4:
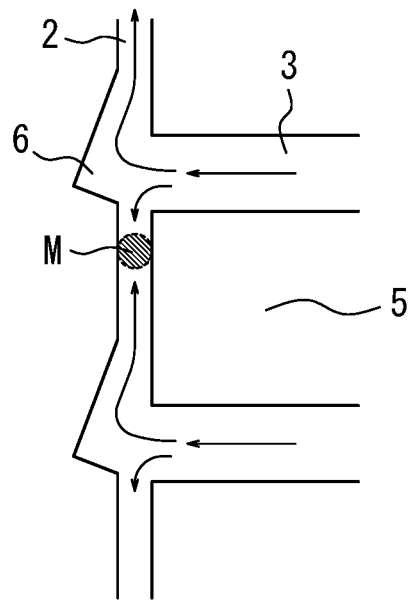
Figure 4:
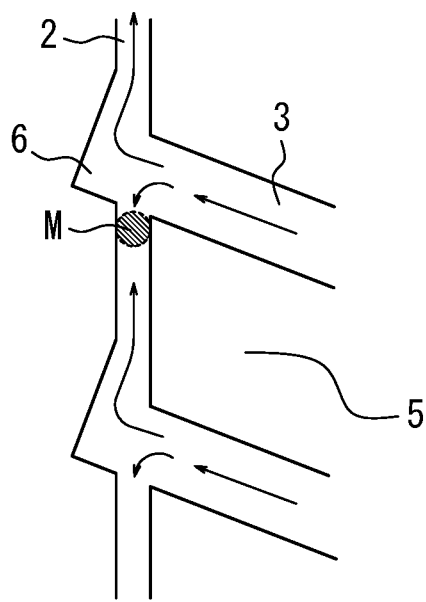

The following describes a function of this disclosure. As illustrated in FIG. 3, when the tire rotates, the wind around the tire flows in the direction opposite to the traveling direction. By taking this wind into the grooves formed on the tread surface 1 and discharging the wind therefrom, heat is dissipated at the tread portion, and the temperature of the tread portion lowers. In particular, in a pneumatic tire for a construction vehicle, since a portion of the tire denoted by X on the vehicle side (on a side opposite to the tread surface) in the figure is not covered by the vehicle but rather is exposed, taking the wind into the groove exhibits a remarkable heat dissipation effect. When a wide groove is formed on the tread surface 1, although more wind may be taken into the groove, rigidity of the land portion is reduced and antiwear performance and steering stability deteriorate. Therefore, it is necessary to lower the temperature of the tread portion without dramatically changing the groove width of an existing groove. I studied the airflow inside the groove and found that, in a tread pattern in which the circumferential grooves 2 are narrow and the widthwise grooves 3 are wide as illustrated in FIG. 4A, the temperature is high at a point M which is an intermediate point of the circumferential groove 2 between two widthwise grooves 3 adjacent in the tire circumferential direction. Although the temperature of the block-shaped land portion 5 is raised by rotation of the tire with a load applied thereon, the temperature of a portion (shaded area) of the block-shaped land portion 5 in the proximity of the widthwise groove 3 lowers due to the heat dissipation by the wind flowing inside the widthwise groove 3. Conversely, heat dissipation does not occur in a portion of the block-shaped land portion 5 remote from the widthwise groove 3. To specifically explain with reference to FIG. 4A, inside the widthwise groove 3, the wind flows from the tread end TE towards the circumferential groove 2 as indicated by the arrows. This wind hits the groove wall surface of the circumferential groove 2 opposite to the widthwise groove 3 and is separated into wind flowing forward and wind flowing backward with respect to the tire rotational direction. As illustrated in the figure, when the widthwise groove 3 is formed perpendicular to the circumferential groove 2, the wind hitting the groove wall surface is separated into wind flowing forward and wind flowing backward in equivalent amounts. The wind flowing forward enters the circumferential groove 2 from the widthwise groove 3 and then, at the intermediate point M, collides with the wind flowing backward that entered the circumferential groove 2 from the widthwise groove 3 adjacent in the tire circumferential direction. Accordingly, the flow of wind stagnates at the point M, thereby preventing heat dissipation of the block-shaped land portion 5. Note that the groove width of the circumferential groove 2 is narrower than the groove width of the widthwise groove 3 in a portion that opens to the circumferential groove 2. In particular, in the illustrated embodiment, since the groove width of the circumferential groove 2 is narrower than the groove width of any portion of the widthwise groove 3, a portion of the block-shaped land portion 5 adjacent to the circumferential groove 2 does not experience as much heat dissipation as a portion adjacent to the widthwise groove 3.

Therefore, as illustrated in FIG. 4B, the recess 6 is formed on the groove wall surface of the circumferential groove 2 opposite to the widthwise groove 3 so that the wind entering the circumferential groove 2 from the widthwise groove 3 is unevenly separated inside the circumferential groove 2. As a result, the point M where the winds collide inside the circumferential groove 2 shifts to a position closer to the widthwise groove 3, and the wind enters the circumferential groove 2 adjacent to a portion of the block-shaped land portion 5 with the highest temperature (an intermediate portion of the block-shaped land portion 5 with respect to the tire circumferential direction), lowering the temperature of the tread portion. As illustrated in FIG. 4C, along with forming the recess 6, the widthwise groove 3 is preferably inclined with respect to the tire width direction. The wind entering the circumferential groove 2 from the widthwise groove 3 can thus be unevenly separated inside the circumferential groove 2, and the point M where the winds collide inside the circumferential groove 2 can be shifted to a position even closer to the widthwise groove 3.

Figure 5:
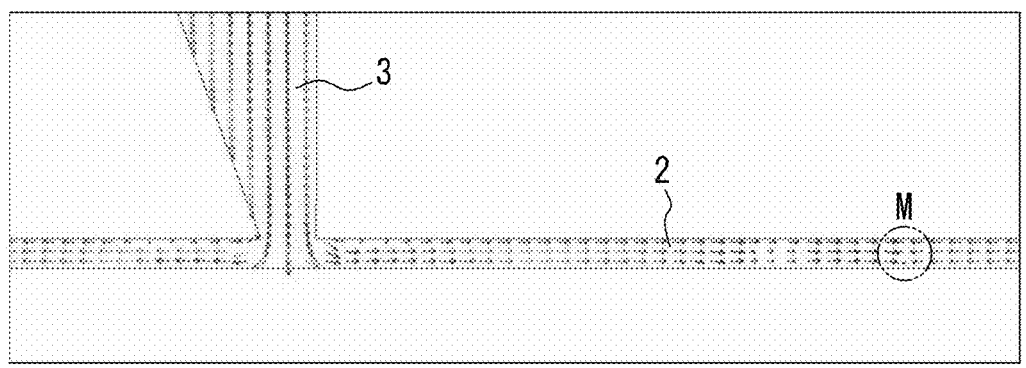
FIGS. 5A to 5C illustrate wind velocity vectors at the bottom of the circumferential groove and the widthwise groove.
Figure 5:
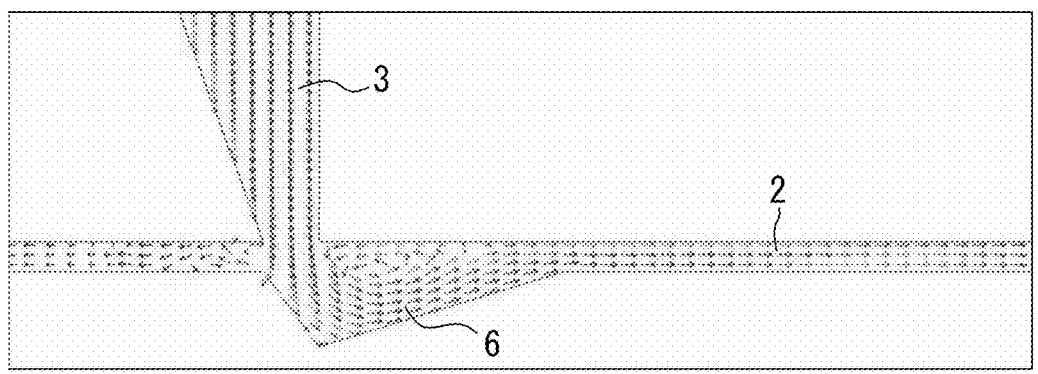
Figure 5:
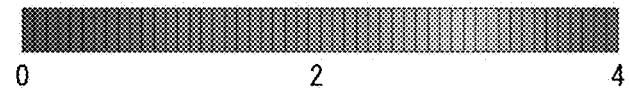

Referring now to FIGS. 5A to 5C, a numerical analysis of wind velocity vectors at the bottom of the circumferential groove 2 and the widthwise groove 3 is described. FIG. 5A illustrates the groove wall surface of the circumferential groove 2 opposite to the widthwise groove 3 having no recess 6 formed thereon, and FIG. 5B illustrates the groove wall surface of the circumferential groove 2 opposite to the widthwise groove 3 having the recess 6 formed thereon. FIG. 5C illustrates the flow rate. As illustrated in FIG. 5A, when the recess 6 is not formed, the flow rate becomes low at the point M, and the winds collide with each other. On the other hand, as illustrated in FIG. 5B, when the recess 6 is formed, the flow rate inside the circumferential groove 2 is increased, and the point where the winds collide with each other is shifted. According to the tire of this embodiment, the heat dissipation of the tread portion can thus be increased.

Figure 6:
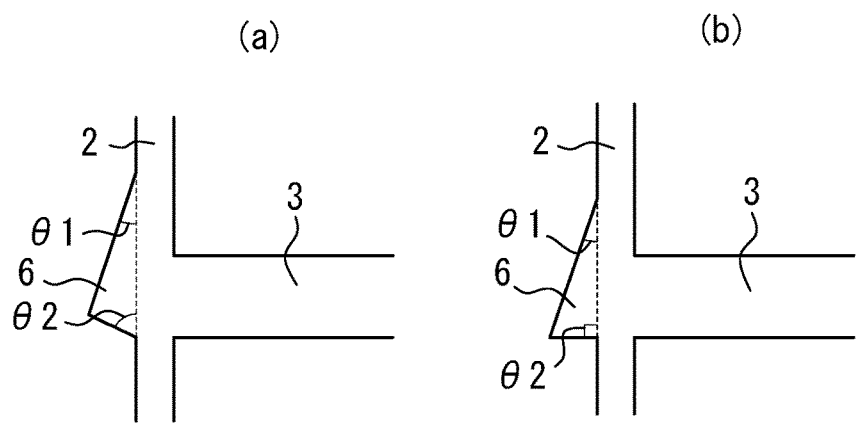
FIGS. 6A to 6C illustrate modifications to the recess.
Figure 6:
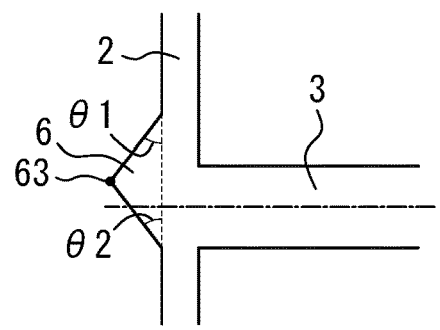
Figure 7:
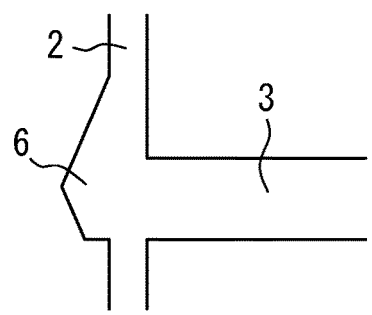
FIGS. 7A to 7B illustrate modifications to the recess.
Figure 7:
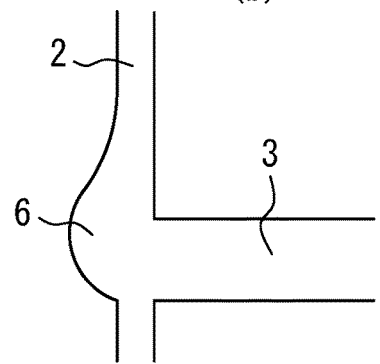

The following is a description of various modifications to the recess 6 with reference to FIGS. 6A to 6C and FIGS. 7A and 7B. As illustrated in FIG. 6A, in plan view from the tread surface 1, the recess 6 preferably has an asymmetric triangular shape with internal angles θ1 and θ2 between the recess 6 and the groove wall of the circumferential groove 2 that satisfy θ1<θ2. As illustrated in FIG. 6B, θ2 may be 90°. As illustrated in FIG. 6C, the recess 6 may have an isosceles triangle shape with equal internal angles θ1 and θ2. In this case, the recess 6 is preferably formed at a position displaced from the widthwise groove 3. That is, the recess 6 is preferably formed such that the apex 63 of the recess 6 is displaced from a center line of the widthwise groove 3 (indicated by an alternate long and short dash line in the figure). In plan view from the tread surface 1, the recess 6 may, other than the triangular shape, have a square shape as illustrated in FIG. 7A or a rounded shape as illustrated in FIG. 7B.

In plan view of the tread surface 1, the length L of the recess 6 in the tire circumferential direction is preferably 150 mm or less, and the maximum width of the recess 6 is preferably 0.0084 TW or greater to 0.042 TW or less. Specifically, the maximum width of the recess is preferably from 10 mm to 50 mm. If the recess 6 is too large, antiwear performance may possibly deteriorate, whereas if the recess 6 is too small, the effect of changing the distribution of the wind inside the circumferential groove 2 may not be obtained sufficiently.

The recess 6 needs to be formed at least in a portion of the groove wall surface between the tread surface and the bottom of the groove and is preferably formed on the bottom of the groove. The temperature of the block-shaped land portion 5 is higher on a side close to the carcass and decreases with increased proximity to the tread surface. Accordingly, the recess 6 is preferably formed on the bottom of the groove, thereby changing the direction of the wind inside the circumferential groove 2 adjacent to the portion with the higher temperature.

Figure 8:
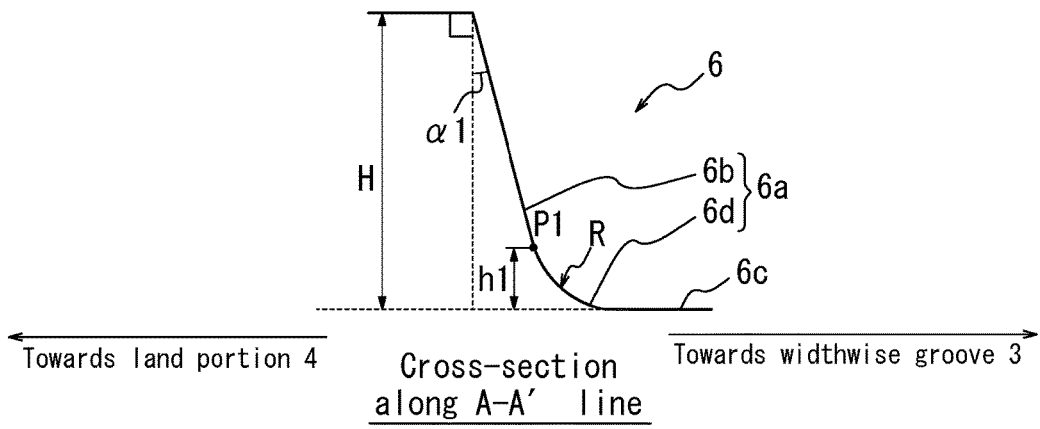
FIG. 8 is a cross-sectional diagram along the A-A' line in FIG. 1.
Figure 9:
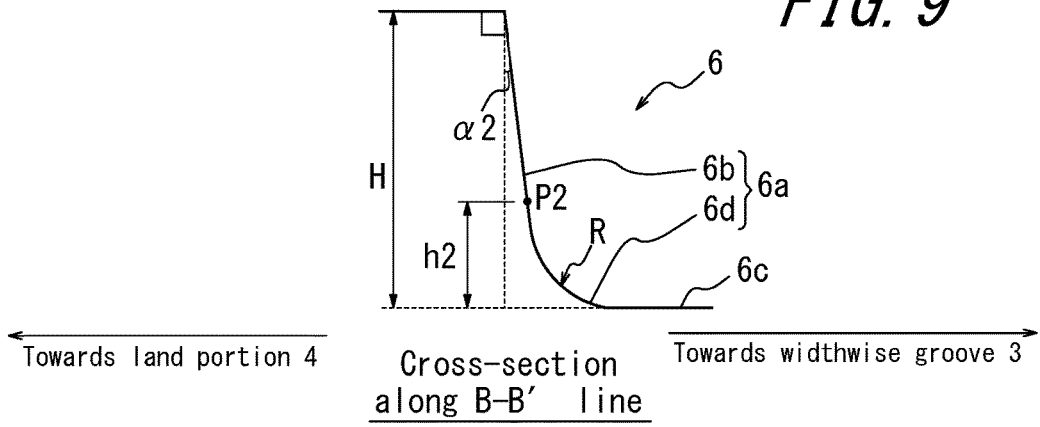
FIG. 9 is a cross-sectional diagram along the B-B' line in FIG. 1.
Figure 10:
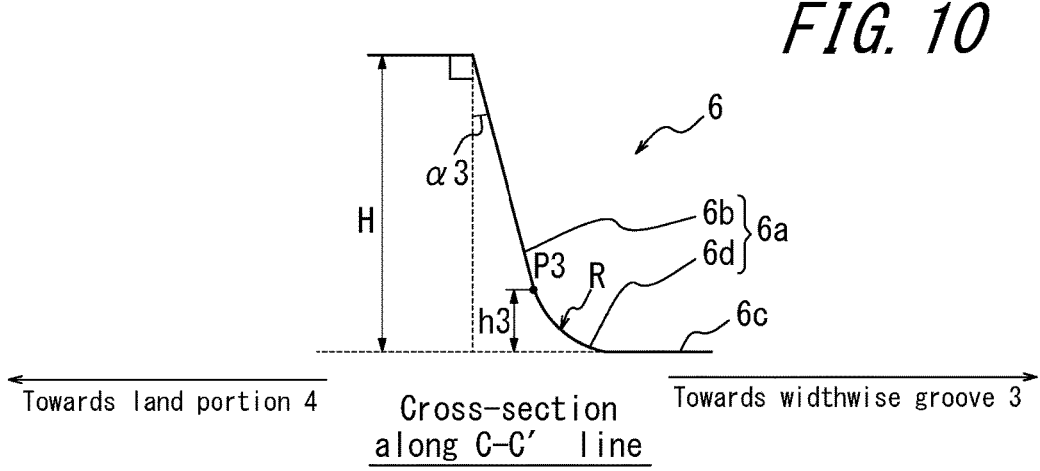
FIG. 10 is a cross-sectional diagram along the C-C' line in FIG. 1.

FIG. 8 is a cross-sectional diagram along the A-A' line in the enlarged view in FIG. 1. FIG. 9 is a cross-sectional diagram along the B-B' line in the enlarged view in FIG. 1, and FIG. 10 is a cross-sectional diagram along the C-C' line in the enlarged view in FIG. 1. As illustrated in FIGS. 8 to 10, the wall surface 6a defined by the recess 6 is formed by an inclined surface 6b inclined towards the widthwise groove 3 (in the example illustrated in FIG. 1, outward in the tire width direction) from the tire radial direction outer side towards the tire radial direction inner side and a curved surface 6d connecting a tire radial direction inner end of the inclined surface 6b to a bottom 6c defined by the recess 6. The curved surface 6d has a center of curvature on the side of the widthwise groove 3.

Furthermore, as illustrated in FIG. 1 and FIGS. 8 to 10, in the cross-sectional diagram along the B-B' line illustrating a position in the tire circumferential direction at which the width W of the recess 6 in the tire width direction is large, the connection point P2 between the inclined surface 6b and the curved surface 6d is located further outward in the tire radial direction than connection points P1 and P3 between the inclined surface 6b and the curved surface 6d. The connection points P1 and P3 are depicted in the cross-sectional diagram along the A-A' line and the cross-sectional diagram along the C-C' line illustrating positions in the tire circumferential direction at which the width W of the recess 6 in the tire width direction is small. In this way, in the tire of this embodiment, as the connection point P between the inclined surface 6b and the curved surface 6d is at a position in the tire circumferential direction at which the width W of the recess 6 in the tire width direction is smaller, the connection point P is located further inward in the tire radial direction. In particular, in this example, as the connection point P is at a position in the tire circumferential direction at which the width W of the recess 6 in the tire width direction is smaller, the height h of the connection point P in the tire radial direction gradually decreases. Here, 0<h≤H/2 for all of the heights h1, h2, and h3 in millimeters of the points P1, P2, and P3 (the distance in the tire radial direction from the bottom surface 6c) in the illustrated examples, where H is the height in millimeters of the land portion 4 defined by the recess 6. Furthermore, in a standard state in which the tire is mounted on an applicable rim, the prescribed internal pressure is applied, and no load is applied, an inclination angle α (α1, α2, α3) of the inclined surface 6b with respect to the tire radial direction is greater than 0° and less than 30° in all of the cases illustrated in FIGS. 8 to 10, and the inclination angle α is larger as the width W of the recess 6 in the tire width direction is smaller. The inclination angle is considered positive when the inclined surface 6b is inclined towards the widthwise groove 3 from the tire radial direction outer side towards the inner side and is considered negative when the inclined surface 6b is inclined towards the land portion 4.

According to the tire of this embodiment, the wall surface 6a of the recess 6 includes the inclined surface 6b inclined towards the widthwise groove 3 from the tire radial direction outer side towards the tire radial direction inner side, thereby making it more difficult for stones to enter deep into the recess 6. Furthermore, the wall surface 6a includes the curved surface 6d that has a center of curvature on the side of the widthwise groove 3, thereby facilitating ejection of stones that enter the recess 6. Since the connection point P between the inclined surface 6b and the curved surface 6d is further inward in the tire radial direction as the connection point P is at a position in the tire circumferential direction at which the width of the recess 6 in the tire width direction is relatively small, the proportion of the inclined surface 6b within the wall surface 6a can be increased at a portion with a small width where stones tend to lodge, thereby reducing the number of stones that enter. Conversely, at a portion where the width of the recess 6 in the tire width direction is relatively large, the inclined surface 6b is closer to being parallel to the tire radial direction, thereby preventing wind that cools the tread portion from escaping to the tire outer surface, so as to guarantee heat dissipation. According to the tire of this embodiment, stone trapping can thus be reduced while guaranteeing heat dissipation of the tread portion. Accordingly, the tire life can be extended. As illustrated in FIG. 6A, when one side extends along the circumferential groove, and the two angles θ1 and θ2 between this side and the other two sides differ, then a configuration may be adopted such that as the connection point P between the inclined surface 6b and the curved surface 6d is at a position in the tire circumferential direction at which the width W of the recess 6 in the tire width direction is smaller, the connection point P is located further inward in the tire radial direction only on the wall surface of the side bordering θ1, which is the smaller of the two angles θ1 and θ2.

In this disclosure, the height h in millimeters of the connection point P is preferably within the following range: $0.11W+3.94 \leq h \leq 0.33W+22.3$.

The reason is that if the height h (mm) is less than 0.11W+3.94, then although the heat dissipation improves, the stone-trapping resistance worsens. Conversely, if the height h (mm) exceeds 0.33W+22.3, then although the stone-trapping resistance improves, heat dissipation may deteriorate. In either case, the tire life may deteriorate.

In this disclosure, the height h (mm) of the connection points P1, P2, and P3 is preferably in the range of $0<h \leq H/2$. Within this range, as the width W of the recess 6 in the tire width direction is smaller, the connection point P between the inclined surface 6b and the curved surface 6d is preferably located further inward in the tire radial direction. The reason is that setting the height h to be H/2 or less guarantees the proportion of the inclined surface 6b and more effectively keeps stones from entering the recess 6.

Furthermore, in this disclosure, in the standard state, the inclination angle α1, α2, α3 of the inclined surface 6b with respect to the tire radial direction is preferably greater than 0° and less than 30°, and as the width W of the recess 6 in the tire width direction is smaller, the inclination angle is preferably larger within this range. The reason is that by setting the inclination angle to be greater than 0°, stones can be kept from entering the recess 6 (as compared to when the inclination angle is 0° or less, i.e. when the inclined surface 6b is parallel to the tire radial direction or the inclined surface 6b is inclined toward the land portion 4 from the tire radial direction outer side towards the inner side). Conversely, by setting the inclination angle to be less than 30°, wind hitting the wall surface 6a of the recess can be prevented from escaping to the tire outer surface, thereby further improving heat dissipation of the tread portion.

In this disclosure, in the standard state, the radius of curvature of the curved surface 6d in the recess 6 is preferably constant. An unnecessary increase in the volume of the groove can thus be avoided.

In this disclosure, a line connecting two end points of the curved surface 6d where the curved surface 6d meets the circumferential groove 2 preferably lies along the tire circumferential direction. The groove bottom shape of the circumferential groove 2 thus need not be changed, and the flow of air within the circumferential groove 2 can be guaranteed.

Furthermore, in this disclosure, the recess 6 preferably has a triangular planar shape when viewed from the tread surface 1. The reason is that since air can flow along the sides of a triangle, the air flows more easily, thereby further reducing stone trapping while guaranteeing heat dissipation in the tread portion.

In this disclosure, a groove width Wc1 of the circumferential groove 2 is preferably within the range $0.0025 TW \leq Wc1 \leq 0.025 TW$, where TW is the tread width between ground contact edges (tread width direction edges of the ground contact surface) when the tire is mounted on an applicable rim, the prescribed internal pressure is applied, and the maximum load (a load corresponding to the above-mentioned maximum load capability) is applied. Furthermore, a groove width Wc2 of the widthwise groove 3 at the portion opening to the circumferential groove 2 is preferably within the range $0.0025 TW \leq Wc2 \leq 0.025 TW$. Setting the groove width Wc2 to be 0.0025 TW or greater guarantees heat dissipation, whereas setting the groove width Wc2 to be 0.025 W allows the groove to close upon ground contact. Accordingly, adopting the above ranges improves antiwear performance.

Figure 11:
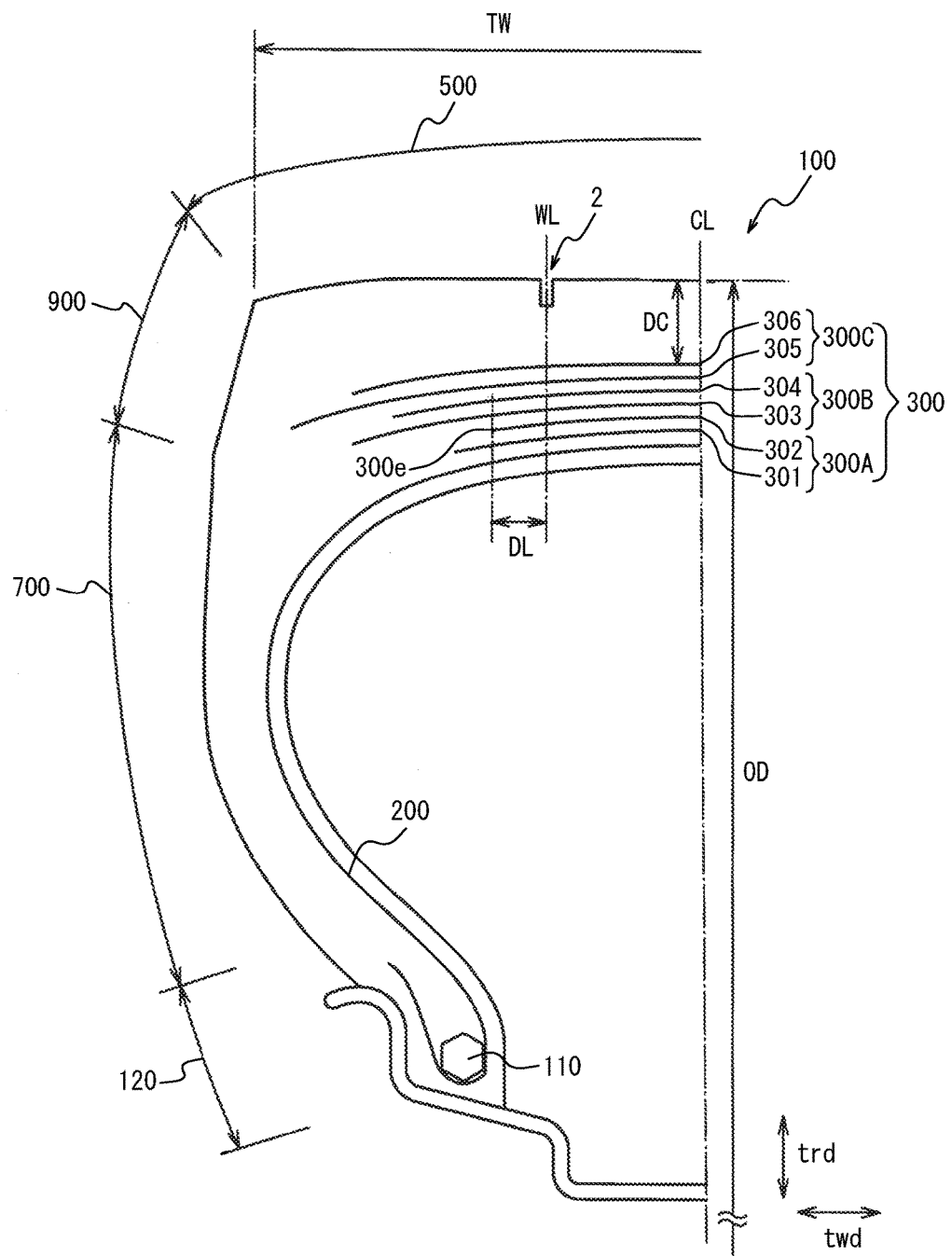
FIG. 11 is a cross-sectional diagram in the tire width direction of a tire according to one of the disclosed embodiments.

FIG. 11 is a cross-sectional diagram in the tire width direction of a pneumatic tire according to one of the disclosed embodiments, in particular illustrating the tire structure of a tire used on a heavy duty vehicle such as a construction vehicle. As illustrated in FIG. 11, as compared to a pneumatic tire mounted on a passenger vehicle or the like, the tread portion 500 in this tire 100 has a thick rubber gauge (rubber thickness).

Specifically, the relationship $DC/OD \geq 0.015$ is satisfied in the tire 100, where OD is the tire outer diameter, and DC is the rubber gauge of the tread portion 500 at a position on the tire equator CL.

The tire outside diameter OD (units: mm) refers to the diameter of the tire 100 at the portion where the outside diameter of the tire 100 is greatest (generally, at the tread portion 500 near the tire equator CL). The rubber gauge DC (units: mm) refers to the rubber thickness of the tread portion 500 at the position of the tire equator CL. The thickness of the belt 300 is not included in the rubber gauge DC. When a circumferential groove is formed at a position that includes the tire equator CL, the rubber gauge DC is taken as the rubber thickness of the tread portion 500 at a position adjacent to the circumferential groove.

As illustrated in FIG. 11, the tire 100 includes a pair of bead cores 110, a carcass 200, and a belt 300 composed of a plurality of belt layers.

The bead core 110 is provided in a bead portion 120. The bead core 110 is formed by bead wire (not illustrated).

The carcass 200 forms the skeleton of the tire 100. The carcass 200 is positioned to extend from the tread portion 500 across a buttress 900 and a sidewall 700 to the bead portion 120.

The carcass 200 has a toroidal shape spanning the pair of bead cores 110. In this embodiment, the carcass 200 wraps around the bead cores 110. The carcass 200 is in contact with the bead cores 110. The edges of the carcass 200 in the tread width direction twd are supported by the pair of bead portions 120.

The carcass 200 includes a carcass cord that, in the tread surface view, extends in a predetermined direction. In this embodiment, the carcass cord extends along the tread width direction twd. Steel wire, for example, is used as the carcass cord.

The belt 300 is provided in the tread portion 500. The belt 300 is positioned on the outside of the carcass 200 in the tire radial direction trd. The belt 300 extends in the tire circumferential direction. The belt 300 includes belt cords that extend at an inclination with respect to the predetermined direction in which the carcass cord extends. Steel cords, for example, are used as the belt cords.

The belt 300 formed by a plurality of belt layers includes a first belt layer 301, a second belt layer 302, a third belt layer 303, a fourth belt layer 304, a fifth belt layer 305, and a sixth belt layer 306.

The first belt layer 301 is positioned on the outside of the carcass 200 in the tire radial direction trd. The first belt layer 301 is positioned furthest inward in the tire radial direction trd within the belt 300 formed by the plurality of belt layers. The second belt layer 302 is positioned on the outside of the first belt layer 301 in the tire radial direction trd. The third belt layer 303 is positioned on the outside of the second belt layer 302 in the tire radial direction trd. The fourth belt layer 304 is positioned on the outside of the third belt layer 303 in the tire radial direction trd. The fifth belt layer 305 is positioned on the outside of the fourth belt layer 304 in the tire radial direction trd. The sixth belt layer 306 is positioned on the outside of the fifth belt layer 305 in the tire radial direction trd. The sixth belt layer 306 is positioned furthest outward in the tire radial direction trd within the belt 300 formed by the plurality of belt layers. From the inside to the outside in the tire radial direction trd, the belt layers are disposed in the order of the first belt layer 301, second belt layer 302, third belt layer 303, fourth belt layer 304, fifth belt layer 305, and sixth belt layer 306.

In this embodiment, in the tread width direction twd, the width of the first belt layer 301 and the second belt layer 302 is 25% or more to 70% or less of the tread width TW. In the tread width direction twd, the width of the third belt layer 303 and the fourth belt layer 304 is 55% or more to 90% or less of the tread width TW. In the tread width direction twd, the width of the fifth belt layer 305 and the sixth belt layer 306 is 60% or more to 110% or less of the tread width TW.

In this embodiment, in the tread width direction twd, the width of the fifth belt layer 305 is greater than the width of the third belt layer 303, the width of the third belt layer 303 is equal to or greater than the width of the sixth belt layer 306, the width of the sixth belt layer 306 is greater than the width of the fourth belt layer 304, the width of the fourth belt layer 304 is greater than the width of the first belt layer 301, and the width of the first belt layer 301 is greater than the width of the second belt layer 302. In the tread width direction twd, within the belt 300 formed by the plurality of belt layers, the width of the fifth belt layer 305 is the greatest, and the width of the second belt layer 302 is the smallest. Accordingly, the belt 300 formed by the plurality of belt layers includes a shortest belt layer with the shortest length in the tread width direction twd (i.e. the second belt layer 302).

The second belt layer 302 that is the shortest belt layer has a belt end 300e that is an end of the second belt layer 302 in the tread width direction twd.

In this embodiment, in the tread surface view, the inclination angle of the belt cords of the first belt layer 301 and the second belt layer 302 with respect to the carcass cord is 70° or more to 85° or less. The inclination angle of the belt cords of the third belt layer 303 and the fourth belt layer 304 with respect to the carcass cord is 50° or more to 75° or less. The inclination angle of the belt cords of the fifth belt layer 305 and the sixth belt layer 306 with respect to the carcass cord is 50° or more to 70° or less.

The belt layers 300 include an inner intersecting belt group 300A, an intermediate intersecting belt group 300B, and an outer intersecting belt group 300C.

The inner intersecting belt group 300A is formed by a pair of belt layers 300 and is positioned on the outside of the carcass 200 in the tire radial direction trd. The inner intersecting belt group 300A is formed by the first belt layer 301 and the second belt layer 302. The intermediate intersecting belt group 300B is formed by a pair of belts 300 and is positioned on the outside of the inner intersecting belt group 300A in the tire radial direction trd. The intermediate intersecting belt group 300B is formed by the third belt layer 303 and the fourth belt layer 304. The outer intersecting belt group 300C is formed by a pair of belts 300 and is positioned on the outside of the intermediate intersecting belt group 300B in the tire radial direction trd. The outer intersecting belt group 300C is formed by the fifth belt layer 305 and the sixth belt layer 306.

In the tread width direction twd, the width of the inner intersecting belt group 300A is 25% or more to 70% or less of the tread width TW. In the tread width direction twd, the width of the intermediate intersecting belt group 300B is 55% or more to 90% or less of the tread width TW. In the tread width direction twd, the width of the outer intersecting belt group 300C is 60% or more to 110% or less of the tread width TW.

In the tread surface view, the inclination angle of the belt cords of the inner intersecting belt group 300A with respect to the carcass cord is 70° or more to 85° or less. In the tread surface view, the inclination angle of the belt cords of the intermediate intersecting belt group 300B with respect to the carcass cord is 50° or more to 75° or less. In the tread surface view, the inclination angle of the belt cords of the outer intersecting belt group 300C with respect to the carcass cord is 50° or more to 70° or less.

In the tread surface view, the inclination angle of the belt cords with respect to the carcass cord is the greatest for the inner intersecting belt group 300A. The inclination angle of the belt cords of the intermediate intersecting belt group 300B with respect to the carcass cord is equal to or greater than the inclination angle of the belt cords of the outer intersecting belt group 300C with respect to the carcass cord.

The circumferential groove 2 is formed so that a length DL along the tread width direction twd is 200 mm or less. The length DL is the length from the belt end 300e to a groove center line WL that traverses the center in the width direction of the circumferential groove 2 in the tread surface view of the tire.

EXAMPLES

In order to confirm the effects of this disclosure, tires according to Examples 1 to 7 and tires according to Comparative Examples 1 to 4 were produced. Table 1 below lists the specifications of each tire. In Table 1, Example 1 has the tread pattern illustrated in FIG. 1 and the wall surface of the recess illustrated in FIGS. 8 to 10. The other tires are the same as Example 1 with respect to specifications not listed in Table 1. Furthermore, the expression "ratio h/H≤½" refers to the heights h1, h2, and h3 of the connection points P1, P2, and P3 each being H/2 or less. Stating that the planar shape of the recess is triangular refers to the recess having the shape illustrated in FIG. 1 described above. Furthermore, the "tire circumferential direction" of the "two end points" refers to how a line connecting two end points of the curved surface where the curved surface meets the circumferential groove lies along the tire circumferential direction. In each tire, the width W of the recess 6 in the tire width direction equals the tread width times a factor of 0.0084 or more to 0.042 or less. Furthermore, the "Relational Expression 1" refers to the expression $0.11W+3.94 \leq h \leq 0.33W+22.3$.

Each of the above tires with a tire size of 53/80R63 was mounted on a rim with a rim size of 36.00/5.0×63. The prescribed internal pressure was applied, the tires were mounted on a vehicle, and the following tests to evaluate the tire life, stone-trapping resistance, and heat dissipation were performed.

<Stone-Trapping Resistance>

The tires were driven ten times over a 20 m unpaved road covered with small stones (diameter of approximately 1 mm to 10 mm), and the number of stones that were trapped inside the grooves (inside the widthwise grooves or the recess) of each tire was measured. The result is indicated as an index as a relative evaluation with the evaluation result of Comparative Example Tire 1 as 100. In Table 1, a larger number indicates longer tire life.

Table 1 below lists the evaluation results along with the tire specifications.

TABLE 1

|  | Comparative Example 1 | Comparative Example 2 | Comparative Example 3 | Comparative Example 4 | Example 1 | Example 2 |
|---|---|---|---|---|---|---|
| Provision of recess 6 | provided | provided | provided | provided | provided | provided |
| Wall surface 6a | perpendicular wall surface only | inclined surface only | curved surface only | inclined surface and curved surface | inclined surface and curved surface | inclined surface and curved surface |
| Inclination angle α (°) of inclined surface 6b | 0 | 20 | — | 20 | 10 | 20 |
| Radius of curvature R (mm) of curved surface 6d | — | — | 20 | 20 | 20 | 20 |
| Ratio h/H | ≤1/2 | ≤1/2 | ≤1/2 | ≤1/2 | ≤1/2 | ≤1/2 |
| Height of connection points P1, P2, P3 | — | — | — | h1 = h2 = h3 | h2 > h1, h3 | h2 > h1, h3 |
| Planar shape of recess 6 | triangular | triangular | triangular | triangular | triangular | triangular |
| Two end points | — | — | tire circumferential direction | tire circumferential direction | tire circumferential direction | tire circumferential direction |
| Length L (mm) of recess 6 | 100 | 100 | 100 | 100 | 100 | 100 |
| Maximum width (mm) of width W of recess 6 | 20 | 20 | 20 | 20 | 20 | 20 |
| Relational Expression 1 | — | — | — | satisfied | satisfied | satisfied |
| Tire life (INDEX) | 100 | 101 | 100 | 102 | 103 | 105 |
| Stone-trapping resistance (INDEX) | 100 | 107 | 101 | 105 | 104 | 107 |
| Heat dissipation | 100 | 98 | 100 | 99 | 99 | 98 |

|  | Example 3 | Example 4 | Example 5 | Example 6 | Example 7 |
|---|---|---|---|---|---|
| Provision of recess 6 | provided | provided | provided | provided | provided |
| Wall surface 6a | inclined surface and curved surface | inclined surface and curved surface | inclined surface and curved surface | inclined surface and curved surface | inclined surface and curved surface |
| Inclination angle α (°) of inclined surface 6b | 30 | 20 | 20 | 20 | 20 |
| Radius of curvature R (mm) of curved surface 6d | 20 | 20 | 20 | 20 | 20 |
| Ratio h/H | ≤1/2 | ≤1/2 | >1/2 | ≤1/2 | ≤1/2 |
| Height of connection points P1, P2, P3 | h2 > h1, h3 | h2 > h1, h3 | h2 > h1, h3 | h2 > h1, h3 | h2 > h1, h3 |
| Planar shape of recess 6 | triangular | rectangular | triangular | triangular | triangular |
| Two end points | tire circumferential direction | tire circumferential direction | tire circumferential direction | not along tire circumferential direction | tire circumferential direction |
| Length L (mm) of recess 6 | 100 | 100 | 100 | 100 | 100 |
| Maximum width (mm) of width W of recess 6 | 20 | 20 | 20 | 20 | 20 |
| Relational Expression 1 | satisfied | satisfied | satisfied | satisfied | not satisfied |
| Tire life (INDEX) | 102 | 101 | 104 | 103 | 103 |
| Stone-trapping resistance (INDEX) | 109 | 108 | 109 | 107 | 106 |
| Heat dissipation | 97 | 95 | 97 | 93 | 98 | number with the number of stones for Comparative Example Tire 1 as 100. A larger index number indicates better stone-trapping resistance.

<Heat Dissipation>

Each of the above tires was mounted on a front wheel with the prescribed internal pressure and the maximum load applied, and the temperature of the tread rubber was measured when driving each tire for 24 hours on a rotating drum. The heat dissipation was evaluated based on the measured temperature. The result is indicated as an index number with the result for Comparative Example Tire 1 as 100. A larger index indicates better heat dissipation.

<Tire Life>

The tire life was evaluated based on the above-described stone-trapping resistance and heat dissipation and expressed as a relative evaluation with the evaluation result of Comparative Example Tire 1 as 100. In Table 1, a larger number indicates longer tire life.

As illustrated in Table 1, all of the tires according to Examples 1 to 7 can reduce stone trapping while guaranteeing heat dissipation. As a result, the tire life is extended. A comparison of Examples 1 to 3 shows that Examples 1 and 2, in which the inclination angle of the inclined surface is improved, have better heat dissipation than Example 3 and a correspondingly extended tire life. Furthermore, a comparison of Example 2 and Example 4 shows that Example 2, in which the planar shape of the recess is triangular, has better heat dissipation than Example 4 and a correspondingly extended tire life. A comparison of Example 2 and Example 5 also shows that Example 2, in which the ratio h/H of the recess is improved, has better heat dissipation than Example 5 and a correspondingly extended tire life. Additionally, a comparison of Example 2 and Example 6 shows that Example 2, in which the configuration of the two end points is improved, has better heat dissipation than Example 6 and a correspondingly extended tire life. A comparison of Example 2 and Example 7 further shows that Example 2, which satisfies Relational Expression 1, has better stone-trapping resistance than Example 7 and a correspondingly extended tire life.

INDUSTRIAL APPLICABILITY

According to this disclosure, a pneumatic tire that reduces stone trapping while guaranteeing heat dissipation in the tread portion and that has an extended tire life can be provided. The pneumatic tire of this disclosure may in particular be used suitably on a heavy duty vehicle such as a construction vehicle.

REFERENCE SIGNS LIST

1 Tread surface
2 Circumferential groove
3 Widthwise groove
4 Rib-shaped central land portion
5 Block-shaped land portion
6 Recess
6a Wall surface
6b Inclined surface
6c Bottom surface
6d Curved surface
100 Tire
110 Bead core
120 Bead portion
200 Carcass
300 Belt
301 First belt
302 Second belt
303 Third belt
304 Fourth belt
305 Fifth belt
306 Sixth belt
300 A Inner intersecting belt group
300 B Intermediate intersecting belt group
300 C Outer intersecting belt group
300e Belt end
500 Tread portion
700 Sidewall
900 Buttress

The invention claimed is:

1. A pneumatic tire comprising, in a tread surface, at least one circumferential groove extending along a tire circumferential direction and a plurality of widthwise grooves opening to the circumferential groove, the widthwise grooves having a groove width wider than a groove width of the circumferential groove at least in a portion opening to the circumferential groove, and the widthwise grooves extending in a direction inclined with respect to the tire circumferential direction, wherein a recess is formed on a groove wall surface of the circumferential groove opposite to the widthwise groove, the recess has a width W measured from a connection point between the recess and the circumferential groove in a tire width direction, a wall surface defined by the recess includes an inclined surface inclined towards the widthwise groove from a tire radial direction outer side towards a tire radial direction inner side and a curved surface connecting a tire radial direction inner end of the inclined surface to a bottom defined by the recess, the curved surface having a center of curvature on the side of the widthwise groove, a connection point between the inclined surface and the curved surface has a height h expressed in mm in the tire radial direction, the height h of the connection point gradually decreases towards the widthwise groove from a position at which the recess has the largest width, and the widthwise grooves communicate between the circumferential groove and a tread edge.

2. The pneumatic tire of claim 1, wherein $$0.11W+3.94 \leq h \leq 0.33W+22.3$$

in mm.

3. The pneumatic tire of claim 1, wherein $$0 < h \leq H/2$$

where H is a height in mm of a land portion defined by the recess.

4. The pneumatic tire of claim 1, wherein in a standard state in which the tire is mounted on an applicable rim, a prescribed internal pressure is applied, and no load is applied, an inclination angle of the inclined surface with respect to the tire radial direction is greater than 0° and less than 30°.

5. The pneumatic tire of claim 1, wherein in the standard state, a radius of curvature of the curved surface in the recess is constant.

6. The pneumatic tire of claim 1, wherein a line connecting two end points of the curved surface where the curved surface meets the circumferential groove lies along the tire circumferential direction.

7. The pneumatic tire of claim 1, wherein the recess has a triangular planar shape when viewed from the tread surface.

8. The pneumatic tire of claim 1, wherein $$0.0025TW \leq Wc2 \leq 0.025TW$$

where TW is a tread width between ground contact edges when the tire is mounted on an applicable rim, a prescribed internal pressure is applied, and a maximum load is applied, and Wc2 is the groove width of the circumferential groove.

* * * * *